(No Model.)  
6 Sheets—Sheet 1.
W. H. H. STEVENSON.
MACHINE FOR HEADING SHEET METAL CANS.
No. 349,373.  Patented Sept. 21, 1886.
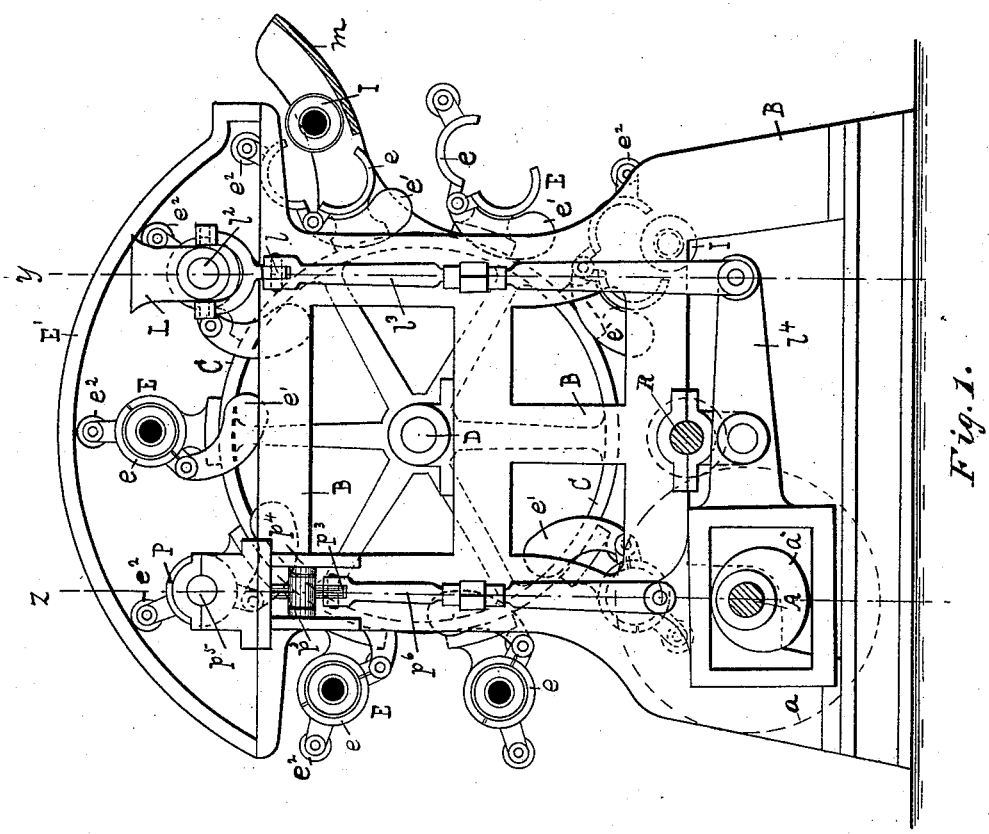
Witnesses:  
Wilson Ringle  
Charles W. Smiley
Inventor:  
Wm. H. H. Stevenson  
By G. A. Boyden atty.

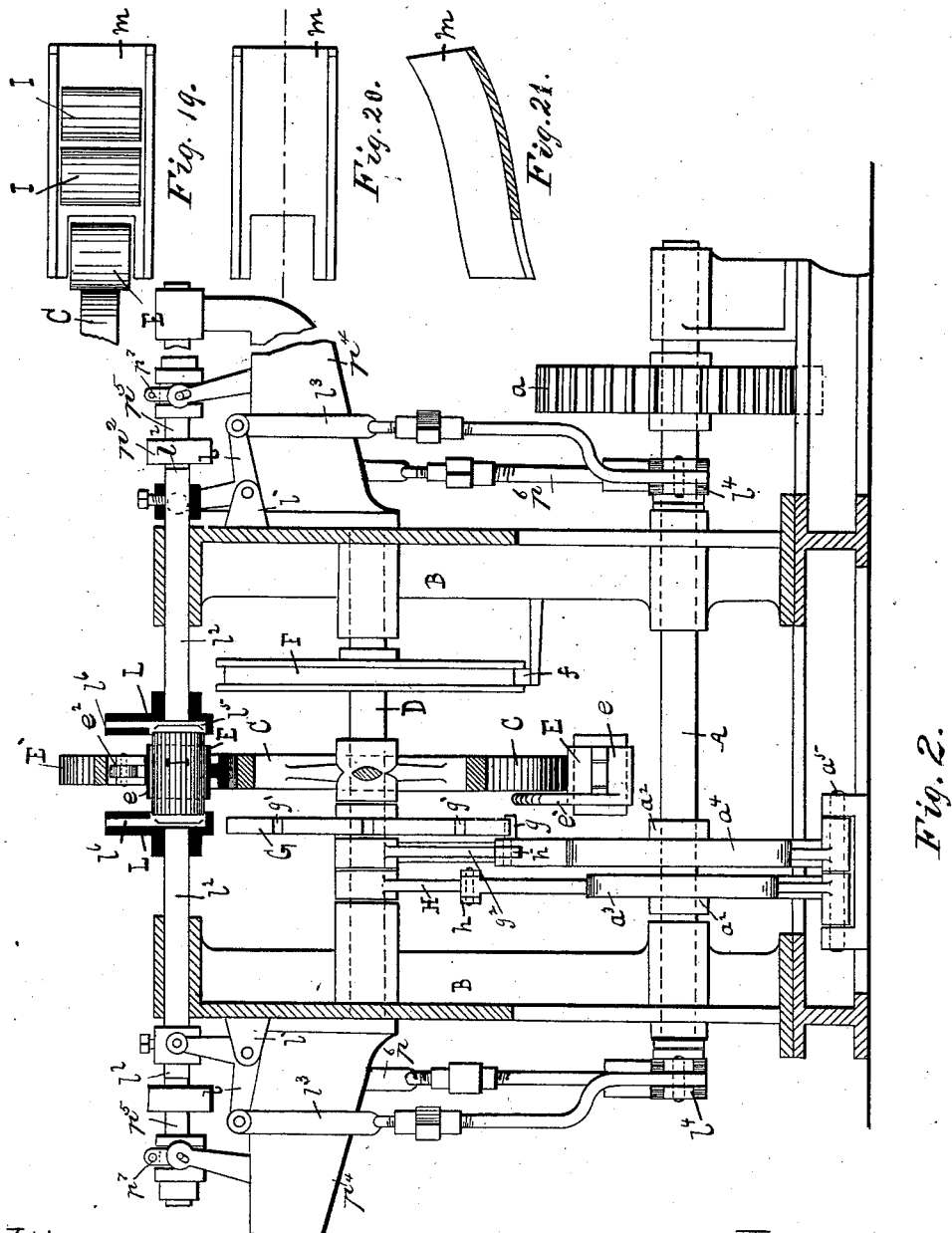

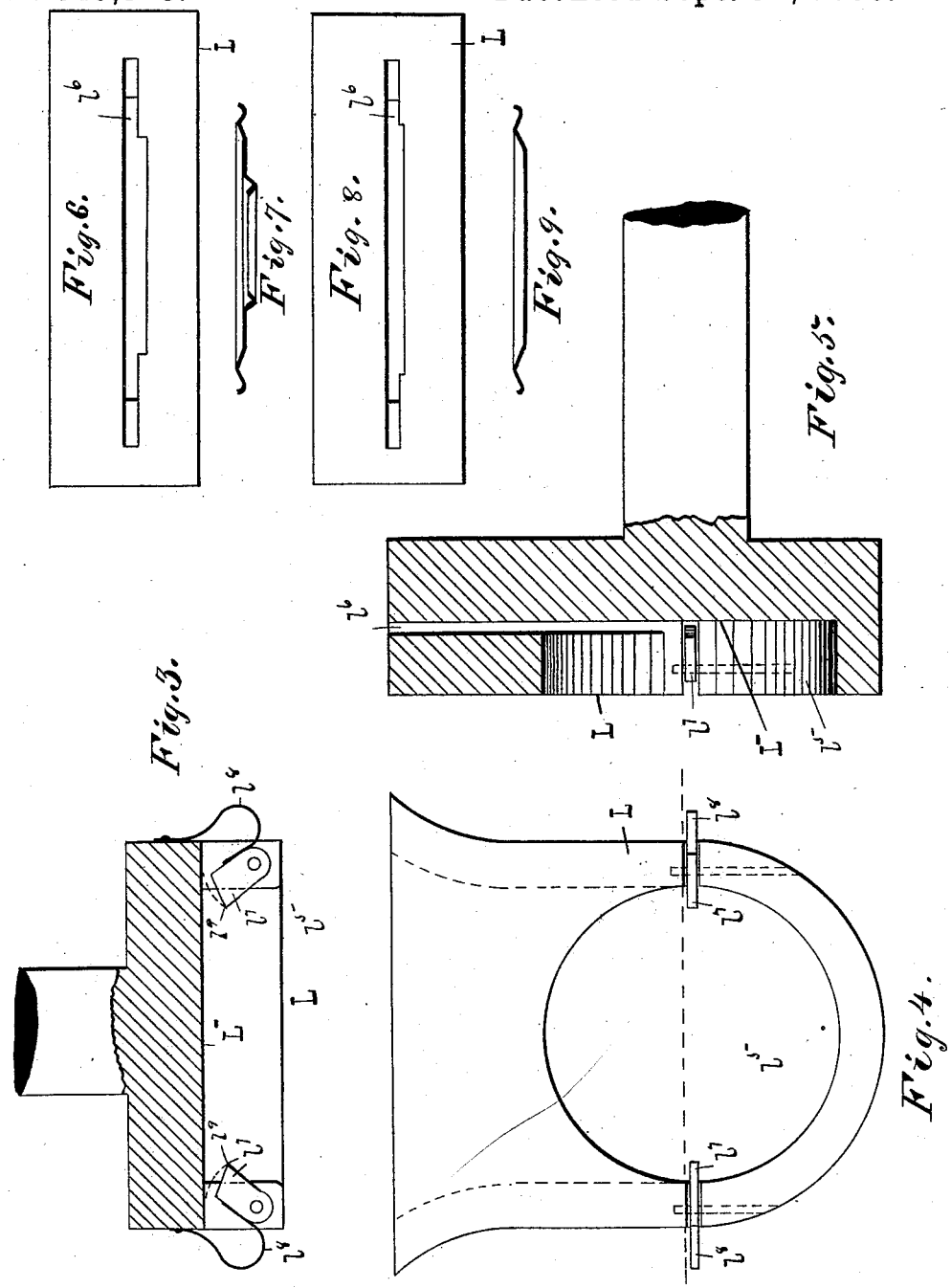

(No Model.) 6 Sheets—Sheet 4.
W. H. H. STEVENSON.
MACHINE FOR HEADING SHEET METAL CANS.
No. 349,373. Patented Sept. 21, 1886.
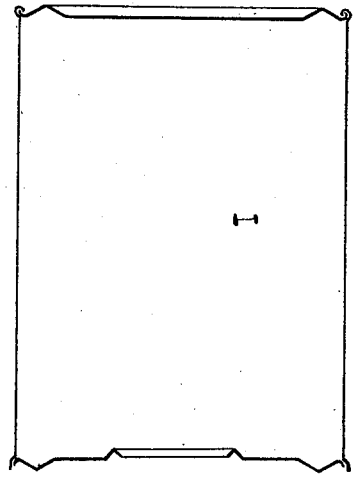
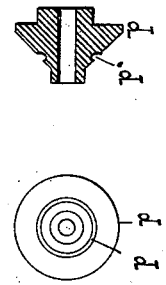
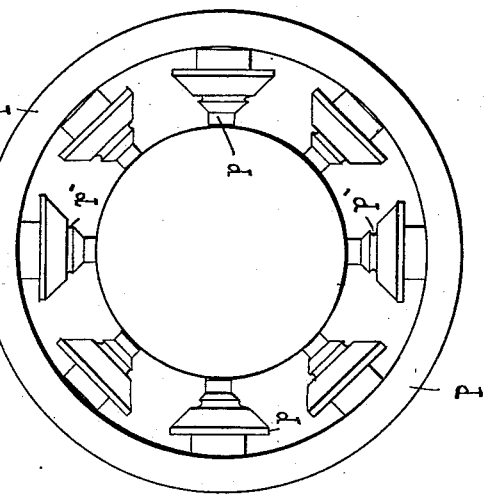
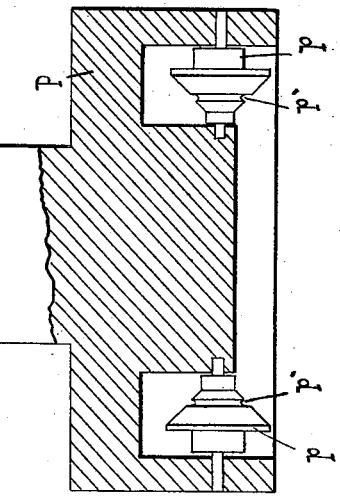
Witnesses:
Wilson Ringle
B. F. Boyden
Inventor:
William H. H. Stevenson
By G. H. Boyden atty.

(No Model.)
W. H. H. STEVENSON.
MACHINE FOR HEADING SHEET METAL CANS.
No. 349,373. Patented Sept. 21, 1886.
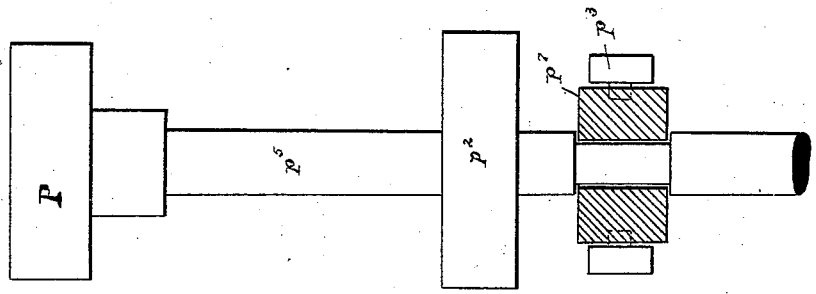
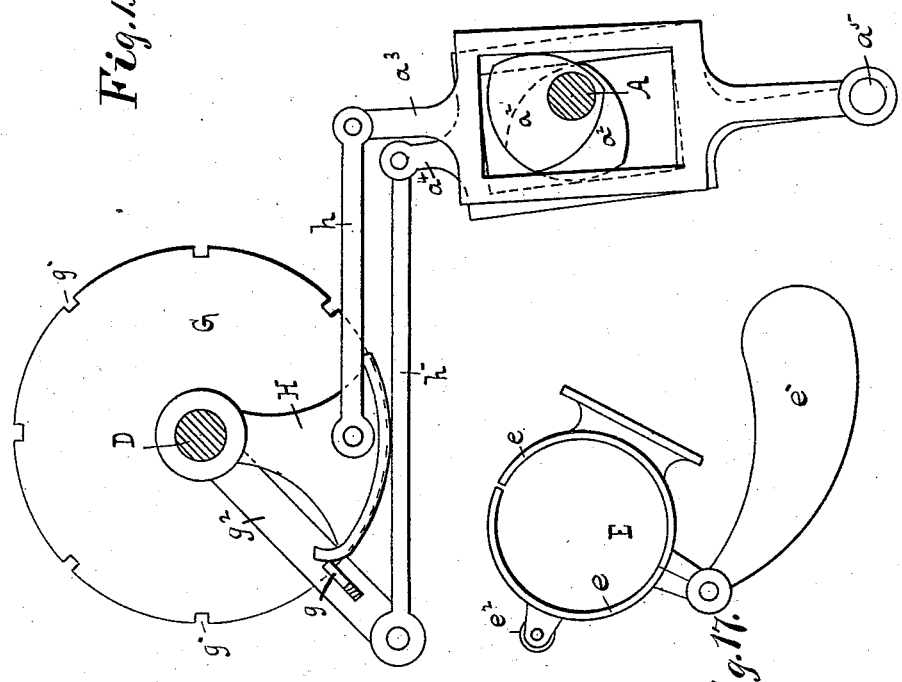
Witnesses:
Wilson Ringle
B. F. Boyden
Inventor:
William H. H. Stevenson
By G. H. Boyden atty.

(No Model.) 6 Sheets—Sheet 6.
W. H. H. STEVENSON.
MACHINE FOR HEADING SHEET METAL CANS.
No. 349,373. Patented Sept. 21, 1886.
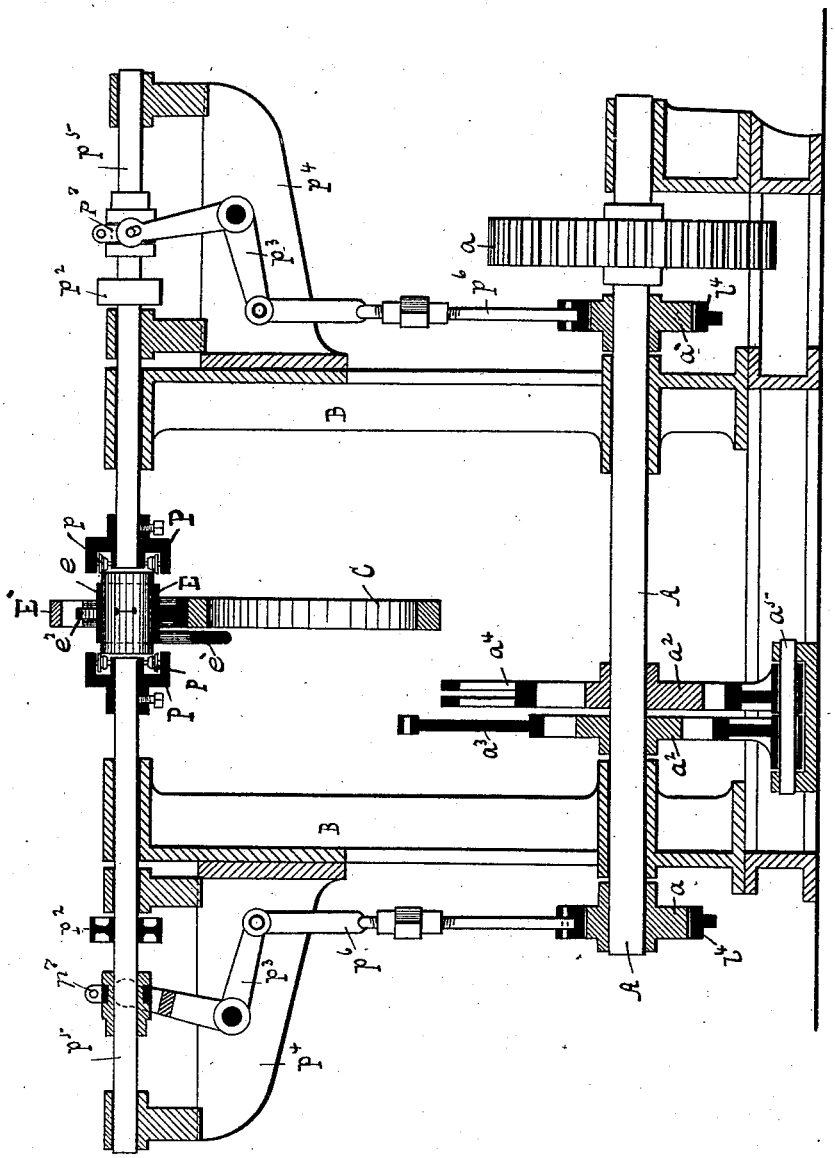

UNITED STATES PATENT OFFICE.

WILLIAM H. H. STEVENSON, OF BALTIMORE, MARYLAND.

MACHINE FOR HEADING SHEET-METAL CANS.

SPECIFICATION forming part of Letters Patent No. 349,373, dated September 21, 1886.

Application filed December 18, 1885. Serial No. 186,080. (No model.)

*To all whom it may concern:*

Be it known that I, WILLIAM H. H. STEVENSON, a citizen of the United States, residing at Baltimore, in the State of Maryland, have invented certain new and useful Improvements in Machines for Heading Sheet-Metal Cans, of which the following is a specification, reference being had therein to the accompanying drawings.

My invention relates to improvements in machines for heading and curling can-bodies, as illustrated in the accompanying drawings, in which—

Figure 1 is a side view of the machine with the feeding-chute in section, showing a can in position to enter one of the clamps; Fig. 2, a vertical sectional view on line $y$ of Fig. 1, looking to the left. Fig. 3 is a cross-sectional view of the end-placing head. Fig. 4 is a front view of the placing-head. Fig. 5 is a sectional view of the placing-head. Fig. 6 is a top view of the head that places the top end of the can. Fig. 7 is a sectional view of the top end of a can. Fig. 8 is a top view of the head that places the bottom end of the can. Fig. 9 is a sectional view of the bottom end of a can. Fig. 10 is a front view of the curling-head. Fig. 11 is a sectional view of a can, the top end not curled over and the bottom end curled. Fig. 12 is a cross-sectional view of the curling-head. Fig. 13 is a front view of one of the curling-rollers. Fig. 14 is a cross-sectional view of the curling-roller. Fig. 15 is an enlarged detail view of the mechanism that imparts intermittent motion to the carrier; Fig. 16, a detail view of the curling-head shaft with the loose collar in section. Fig. 17 is an enlarged detail view of the clamping devices; Fig. 18, a vertical sectional view on line $z$ of Fig. 1, looking to the left; Fig. 19, a top detail of the feeding-chute, showing two cans in position and the clamp in the act of passing up; Fig. 20, a like view of Fig. 19, with the cans and clamp removed; Fig. 21, a sectional view on dotted line of Fig. 20.

Similar letters refer to similar parts.

The letter B designates the frame, and A the main shaft, provided with the gear-wheel $a$, by which the machine is driven. The two cams $a'$ $a'$ reciprocate the curling and placing heads, and the two heart-cams $a^2$ actuate the mechanism that imparts to the carrier C intermittent motion.

In the vertical center of the machine is arranged the shaft D, to which is attached the carrier C, having attached the clamping devices E; the brake-wheel F, by which the rotation of the carrier is steadied by the brake-block $f$, secured to the frame B; the notched wheel G, which engages with the intermittent mechanism by the pawl $g$ entering the notches $g'$; the swinging arm $g^2$, provided with the spring-pawl $g$, and the swinging sector H, which disengages the pawl $g$ from the notches $g'$.

From the sector H and the swinging arm $d^2$ extend the connecting-rods $h$ and $h'$, which are attached to the vibrating arms $a^3$ and $a^4$. The arms $a^3$ and $a^4$ are pivoted at $a^5$, and provided with an oblong opening to permit the cams $a^2$ $a^2$ to rotate therein, and thereby vibrate them, which, by means of the connecting-rods, vibrates the sector H and the swinging arm $g^2$, and the pawl $g$ on the arm $g^2$, engaging with the notches in the periphery of the wheel G, rotates the carrier C intermittently forward, as the wheel G, carrier C, and brake-wheel E are rigidly attached to the shaft D. The pawl $g$ is withdrawn from the notches by the sector H moving forward when the swinging arm $g^2$ is at rest, which depresses the pawl and holds it there until released on the backward stroke. By this mechanism the pawl $g$ is not withdrawn from the notches $g'$ until the carrier C is at rest, thereby preventing any unsteadiness of the carrier, and insuring the stopping of it at the proper point.

To the periphery of the carrier C are secured the can-clamping devices E, which consists of a split cylinder, $e$, hinged at one side. The movable portion of this device is provided with a weight, $e'$, which at certain points around the carrier opens the cylinder to discharge and receive the cans, and with a roller, $e^2$, which comes in contact with the band E', and closes the cylinder after a can, I, is in position, and there holds it until it is headed. The can-end-placing heads L are supported in suitable bearing on the frame B in such a manner that they can reciprocate, by which the carrier C is permitted to move a can between them when apart, and then afterward place the ends of the can in the body portion when brought together. The said placing-heads are actuated by right-angled levers $l$, pivoted to the arms $l'$, with one end secured to the shaft $l^2$ and the other to the connecting-rod $l^3$, which is secured to the rock-arm $l^4$, which is pivoted at $l^5$, and is moved up and down by the cams $a'\,a'$ on the main shaft A. The placing-heads L are shown in Figs. 3, 4, 5, 6, and 8, and have a circular depression, $l^5$, of a diameter slightly larger than that of the can-body, and a vertical slot, $l^6$, in which the ends are placed, and which directs them to the depression $l^5$, to enable them to be placed in the can-body. The ends of the can are held in their place in the circular depression $l^5$ by the pivoted fingers $l^7$, which are held in their normal position by the spring $l^8$. When the can-body enters the circular depression, its end comes in contact with the fingers $l^7$, thereby moving thereon outward, and while the point $l^9$ thereof describes a segment of a circle the cap for the can is moved backward and held against the surface L', which squarely places it in the can-body, and it is then removed, together with the body, the fingers being pressed far enough outward by the body to permit the same. As shown in Figs. 6 and 8, the slots $l^6$ are of different contour, by which the proper position of the ends are insured in relation to the can-body; otherwise the operator might place an end in the slot $l^6$, with the cap-crease facing the wrong way, thereby allowing it to be improperly secured to the can. The curling-heads P are provided with a series of beveled and grooved rollers, $p$, the beveled surface of which directs the edge of the can to the grooves $p'$, which curls the same over the head, and thereby securely holds the heads in the can ready for soldering. The heads P are rotated by the pulley $p^2$ and reciprocated by the right-angled lever $p^3$, pivoted to the arm $p^4$, with one end secured to the loose collar $p^7$ on the shaft $p^5$, and the other end connected to the rock-arm $l^4$ by means of the rod $p^6$. The upward movement of the end of the rock-arm, to which the rod $p^6$ is attached, withdraws the curling-heads P from the can, and the opposite movement moves it against the can.

The feeding-chute $m$ is secured to the frame B of the machine with its lower surface on a line with the stationary part of the clamp E that is in position to be closed by the next movement of the carrier C, the said chute consisting of two parallel sides, by which the can is guided properly, with a portion of its under surface cut away to permit the clamps E to pass up between its sides, thereby, when the carrier C pauses, permitting a can to be rolled into the clamp E at that point, which is then secured therein by the movement of the carrier, bringing the roller $e^2$ thereon in contact with the band E' and closing the clamp, which retains the can I in its proper position until headed and curled.

In operating the machine, the cans are placed in the chute $m$, and the ends of the same are placed in the placing-heads L, and they are continually fed in as they are removed by the machine.

All parts of the machine, except those on the shaft $p^5$, are automatically actuated from the main shaft A, which, as it rotates, vibrates the arms $a^3$ and $a^4$, the forward movement of which rotates the carrier one-eighth of the circle traversed, and the backward movement places the arm $g^2$ in position to engage the pawl with the following notch in the wheel G. As the latter movement is taking place, the placing-heads L and the curling-heads P are brought in contact with the can-body, whereby the ends are placed in the can-body between the heads L, and the edges of the can curled over between the heads P, after which these heads are withdrawn and the carrier C again moved one notch farther forward. While the carrier C is at rest two other cans are operated on, as before stated. The headed cans are dropped out on the side of the machine with the chute and under the same, as at that point the weight $e'$ of the clamping device opens the cylinder $e$, and thereby releases the can.

The machine is driven from the counter-shaft R, provided with a pinion that engages with the wheel $a$.

Having described my invention, I claim and desire to secure by Letters Patent of the United States—

1. In a machine for heading and curling over the edges of cans, the combination of the reciprocating placing-heads L, the curling-heads P, and a rotary carrier, C, provided with can-clamping devices, for the purpose specified.

2. The combination of the rotary carrier C, the clamping-cylinders E, mounted on the carrier, means for operating the clamping-cylinder, the reciprocating placing-heads L, and the curling-heads P, whereby the cans are first clamped on the carrier C, the end placed in the can-bodies, and the edges of the can-body turned over.

3. The combination of the carrier C, the clamping devices E, mounted on the carrier, the placing-heads L, the curling-heads P, and the band E', arranged to operate the clamping devices.

4. The combination of the carrier C and the clamping devices E, mounted on the carrier, and provided with weights which will open the said clamps.

5. In a curling-head for turning over the edges of can-bodies, the head P, arranged to rotate, and provided with a series of beveled and grooved rollers.

6. A head for placing the ends of cans in can-bodies, having a circular depression, $l^5$, and the slot $l^6$, constructed to receive the end of the can-body in only one position.

7. The heads L, constructed with the circular depression $l^5$, the slot $l^6$, and provided with the yielding finger $l^7$ and $l^8$, for the purpose set forth.

In testimony whereof I affix my signature in presence of two witnesses.

WILLIAM H. H. STEVENSON.

Witnesses:
G. A. BOYDEN,
JNO. T. MADDOX.